US012177642B2

(12) United States Patent
Kamperman et al.

(10) Patent No.: US 12,177,642 B2
(45) Date of Patent: Dec. 24, 2024

(54) SPEAKER-ELEMENT AND SPEAKER COMPRISING SUCH A SPEAKER-ELEMENT

(71) Applicant: IF-ADAMAS B.V., Doetinchem (NL)

(72) Inventors: André Kamperman, Doetinchem (NL); Frederikus Hendrikus Gerardus Uytdewilligen, Braamt (NL)

(73) Assignee: IF-ADAMAS B.V., Doetinchem (NL)

( * ) Notice: Subject to any disclaimer, the term of this patent is extended or adjusted under 35 U.S.C. 154(b) by 274 days.

(21) Appl. No.: 17/638,089

(22) PCT Filed: Aug. 27, 2020

(86) PCT No.: PCT/NL2020/050528
§ 371 (c)(1),
(2) Date: Feb. 24, 2022

(87) PCT Pub. No.: WO2021/040520
PCT Pub. Date: Mar. 4, 2021

(65) Prior Publication Data

US 2022/0279282 A1 Sep. 1, 2022

(30) Foreign Application Priority Data

Aug. 27, 2019 (NL) ...................................... 2023714

(51) Int. Cl.
*H04R 25/00* (2006.01)
*H04R 9/02* (2006.01)
*H04R 9/06* (2006.01)

(52) U.S. Cl.
CPC ............. *H04R 9/063* (2013.01); *H04R 9/025* (2013.01)

(58) Field of Classification Search
CPC .......... H04R 7/04; H04R 9/025; H04R 9/047; H04R 9/063
USPC .......................................................... 381/396
See application file for complete search history.

(56) References Cited

U.S. PATENT DOCUMENTS 6,480,614 B1 11/2002 Denda et al.
2011/0038494 A1 2/2011 Graber
2018/0132019 A1 5/2018 Riedel et al.

FOREIGN PATENT DOCUMENTS

DE 102017102219 A1 8/2018
WO 9510166 A1 4/1995

OTHER PUBLICATIONS

International Search Report and Written Opinion for PCT/NL2020/050528, mailed Nov. 12, 2020 (10 pages).

*Primary Examiner* — Phylesha Dabney
(74) *Attorney, Agent, or Firm* — KDW Firm PLLC

(57) ABSTRACT

A speaker-element for a speaker includes two substantially mutually opposing spaced apart membrane planes, where each membrane plane comprises at least one electromagnetic wire arranged for creating a magnetic field upon an electric current passing through the electromagnetic wire. A permanent magnet is arranged between the two membrane planes, the electromagnet wires of the two membrane planes are connectable to an electric power source so that the electric current passes therethrough in substantially mutually opposing directions to create substantially mutually opposing magnetic fields, such that upon passing an electric current through the electromagnetic wire of each membrane plane said membrane planes are both either attracted towards or repulsed from the permanent magnet and thereby moved towards or away from each other, respectively, thereby producing a sound wave.

20 Claims, 5 Drawing Sheets

SPEAKER-ELEMENT AND SPEAKER COMPRISING SUCH A SPEAKER-ELEMENT

This application is a national stage filing under 35 U.S.C. 371 of pending International Application No. PCT/NL2020/050528, filed Aug. 27, 2020, which claims priority to Netherlands Patent Application No. 2023714, filed Aug. 27, 2019, the entirety of which applications are incorporated by reference herein.

The invention relates to a speaker-element for a speaker and speaker comprising such a speaker-element.

Speakers and speaker-elements thereof are known per se. Said known speakers and speaker-elements thereof are suitable for producing sound waves in a certain frequency range, and generally different speakers or different speaker-elements are provided for different frequency ranges. For example, a first speaker or speaker-element may be provided for a frequency range of about 100 Hz-22 kHz, and a second speaker of speaker-element may be provided for a frequency range having frequencies lower than about 150 Hz, also known as a subwoofer.

It is an object of the invention to improve said known speaker and speaker-elements thereof. More in particular it is an object of the invention to provide one speaker and/or one speaker-element that is suitable for producing sound waves at a full frequency range, i.e. for example between about 0-22 kHz.

Said speaker-element comprises in accordance with the invention two substantially mutually opposing spaced apart membrane planes, wherein each membrane plane comprises at least one electromagnetic wire arranged for creating a magnetic field upon an electric current passing through said electromagnetic wire, wherein at least one permanent magnet is arranged between the two membrane planes, wherein the electromagnet wires of the two membrane planes are connectable to an electric power source in such a manner, that the electric current passes there trough in substantially mutually opposing directions and thereby creating substantially mutually opposing magnetic fields, such that upon passing an electric current through the electromagnetic wire of each membrane plane said membrane planes are both either attracted towards or repulsed from the permanent magnet and thereby moved towards or away from each other, respectively, thereby producing a sound wave.

The applicant has found that such a speaker-element is able to produce sound waves in a frequency range of about 0-22 kHz, thereby reducing the need for further speaker-elements having a different frequency range, i.e. no separate subwoofer is needed for low frequencies.

Said two membrane planes may be relatively light and/or relatively small, thereby being able to produce said sound waves in said large frequency range.

By providing said two membrane planes the sound waves produced thereby are added.

The membrane planes may be composed by one continuous membrane that is bent to form said two membrane planes, or by two separate membranes. Said "two substantially mutually opposing spaced apart membrane planes" may therefore alternatively be defined as "at least one membrane comprising two substantially mutually opposing spaced apart planes" or "at least one membrane comprising two substantially mutually opposing spaced apart plane-like parts".

The electromagnetic wires of the two membrane planes may be arranged substantially parallel to each other, wherein in the one wire the current passes in a first direction, and in the other wire the current passes in a second, opposite direction. Because the current passes through the wires in substantially opposing directions, the electrometric fields created by the wires are also substantially opposing. Therefore the wires, and thereby the membrane planes, are moved in substantially opposing directions, i.e. towards or away from each other.

Each electromagnetic wire may extend in plane with a respective one the two membrane planes.

The permanent magnet may be arranged symmetrically between the two membrane planes.

The permanent magnet may for example be a neodymium magnet.

The membrane plane may for example comprise a Polyethylene terephthalate (PET) membrane or foil, for example known as Mylar.

The membrane plane may for example be around 0.019 mm thick.

In an embodiment of the speaker-element according to the invention each electromagnetic wire is arranged substantially in a middle line of each membrane plane, such that substantially equal membrane parts are arranged on both sides of said electromagnetic wire.

By providing the electromagnetic wire in the middle line of each membrane plane, the membrane plane may be evenly moved.

In other, possibly less preferable embodiments, it is possible to arrange the electromagnetic wire in a different location with respect to each membrane plane. As an example, the electromagnetic wire may be arranged along a line bisecting a half of each membrane plane.

The middle line may for example either be the substantially vertical or substantially horizontal middle line of the membrane plane.

The electromagnetic wire may in particular extend over the whole length or whole width of said membrane plane.

It is noted that the electromagnetic wires may be arranged in the same middle lines of the two membrane planes, i.e. the middles lines of the membrane planes that extend substantially parallel to each other, such that the wires extend substantially parallel with respect to each other.

In another embodiment of the speaker-element according to the invention said permanent magnet extends substantially parallel to the at least two electromagnetic wires with a longitudinal length thereof in such a manner, that the at least two electromagnetic wires are arranged in front of two opposing longitudinal surfaces of the permanent magnet.

In this embodiment the permanent magnet extends longitudinally between the two membrane planes, wherein each of said two opposing longitudinal surfaces of the permanent magnet faces a respective one of the two membrane planes in the area of the electromagnetic wire of that membrane plane, such that the electromagnetic wire is arranged in front of that longitudinal surface of the permanent magnet.

In yet another embodiment of the speaker-element according to the invention said two substantially mutually opposing membrane planes are arranged at an angle with respect to each other, said angle may be oblique, said angle may be chosen between 0° and 75°. Said angle may for example be chosen in correspondence with a desired direction of sound waves produced by the membrane planes and/or a desired setup of the speaker.

At an angle of 0°, said membrane planes extend parallel to each other. At an angle larger than 0° up to about for example 75° said membrane planes extend oblique with respect to each other. More in particular, at an angle larger than 0° up to about 75° said membrane planes may diverge from each other in a direction substantially orthogonal to the direction of the electromagnetic wires.

In yet another embodiment of the speaker-element according to the invention said two membrane planes together define a circumferential edge zone, which circumferential edge zone is closed over a first part thereof and open over a second part thereof.

Sound waves that are produced internally of the speaker-element are able to leave the speaker-element via the open circumferential edge zone part.

As an alternative, the open circumferential edge zone part could be closed by e.g. a fabric which allows the passage of sound waves relatively undistorted and/or undamped. As yet another alternative, the closed circumferential edge zone parts could be left open, in order to allow sound to exit in different directions.

Said circumferential edge zone may in particular have a substantially quadrangular shape as seen in a side view of the speaker-element, wherein three neighboring circumferential edge zone parts are closed, and the other, fourth circumferential edge zone part is open.

In particular, if said membrane planes diverge as described above, said circumferential edge zone part that is located at the diverging end of the speaker-element may be the open edge zone part.

Said closed circumferential edge zone parts may for example be closed by a frame.

In yet another embodiment of the speaker-element according to the invention each membrane plane comprises four of said electromagnetic wires, which four wires are arranged in parallel to each other with no or a small mutual distance. For example, said distance may be up to 2 mm, but preferably smaller.

The applicant has found that four of said electromagnetic wires are able to produce a magnetic field of sufficient strength.

It is noted that the direction of the electric current passing through the electromagnetic wires is the same for all electromagnetic wires of a said membrane plane.

Each electromagnetic wire may have a thickness of about 0.2 mm.

Each electromagnetic wire may be a copper wire.

The or each electromagnetic wire may be attached to the membrane plane in any desired way. Practically the or each electromagnetic wire may be attached to the membrane plane using a polyimide tape, for example known as Kapton.

In yet another embodiment of the speaker-element according to the invention said speaker-element comprises a frame for holding a circumferential edge of each membrane plane, wherein the circumferential edge of each membrane plane is arranged between two frame parts of said frame and held tight thereby.

Said frame may for example comprise four of said frame parts, wherein two frame parts are arranged for holding a respective membrane plane. Alternatively said frame may form example comprise three of said frame parts, wherein a central frame part is arranged between the two membrane planes and arranged for holding a respective membrane plane on opposite sides thereof.

Said speaker-element may further comprise two angular profiles made of a flexible and/or compressible material, such as rubber, said angular profiles being arranged between said frame parts in the area of said circumferential edge of the membrane plane, for tensioning said membrane plane.

Said membrane planes are preferably held in a tensioned manner. This may for example be achieved by said angular profiles.

The invention also relates to a speaker, comprising a plurality of speaker-elements as described above according to any of the described embodiments, alone or in any suitable combination, or having any one or more described feature, in any suitable combination.

Said plurality of speaker-elements may be arranged with respect to each other in any suitable way. For example, said plurality of speaker-elements may extend in a same plane in for example parallel rows.

In a preferred embodiment said speaker defines a central longitudinal line, wherein said plurality of speaker-elements are arranged in a radial direction with respect to said central longitudinal line and spaced apart by an angular distance.

Said angular distance may be chosen as desired, for example in accordance with a suitable sound angle and/or in accordance with a number of speaker-elements.

If said diverging membrane planes are provided, the converging ends of the speaker-elements may be the radially outward ends, and the, opposing, diverging ends of the speaker-elements may be the radially inward ends, i.e. the diverging ends may be arranged towards said central longitudinal line.

Practically five of said speaker-elements are provided which are spaced apart over an angular distance of about 60°.

In such an embodiment the five speaker-elements produce the sound waves over an angular range of about 300°.

Said part of the speaker where no speaker-element is provided may be for example used for passing through electrical wires or for arranging any other desired hardware. Said speaker may for example be used in such a manner that said part of the speaker where no speaker-element is provided may be directed towards a wall.

Said speaker may comprise at least one further series of five of said speaker-elements which are spaced apart over an angular distance of about 60°, and wherein the at least one further series is arranged on top of said five speaker-elements in such a manner that the speaker-elements are aligned.

In another preferred embodiment of the speaker according to the invention, the plurality of speaker elements are spaced along and aligned with each other along an imaginary line with one membrane plate of one speaker-element substantially facing a membrane plate of an adjacent speaker-element.

Such a speaker may be suitable for presenting sound to produce sound in a relatively large space or outside. The imaginary line may be straight.

In particular the imaginary line along which the speaker-elements are arranged may comprise a first section which is straight, and a second section which is curved. If the speaker-elements are of the above-described kind having membrane planes disposed at a non-zero angle with respect to each other, the curved section of the imaginary line may curve in the opposite direction as the angle between the membrane planes of a single speaker element.

Such a speaker may be suitable for presenting sound to a relatively large audience, wherein the speaker-elements along the straight section of the imaginary line may be used to direct the produced sound further away at a relatively small angle with respect to the horizon, and the speaker-elements along the curved section of the imaginary line may be used to direct sound closer to the speaker at a relatively large angle with respect to the horizon.

The invention will be further elucidated with reference to the attached schematic figures, in which.

In the figures, like elements are referred to by like reference numerals.

Figure 1A:
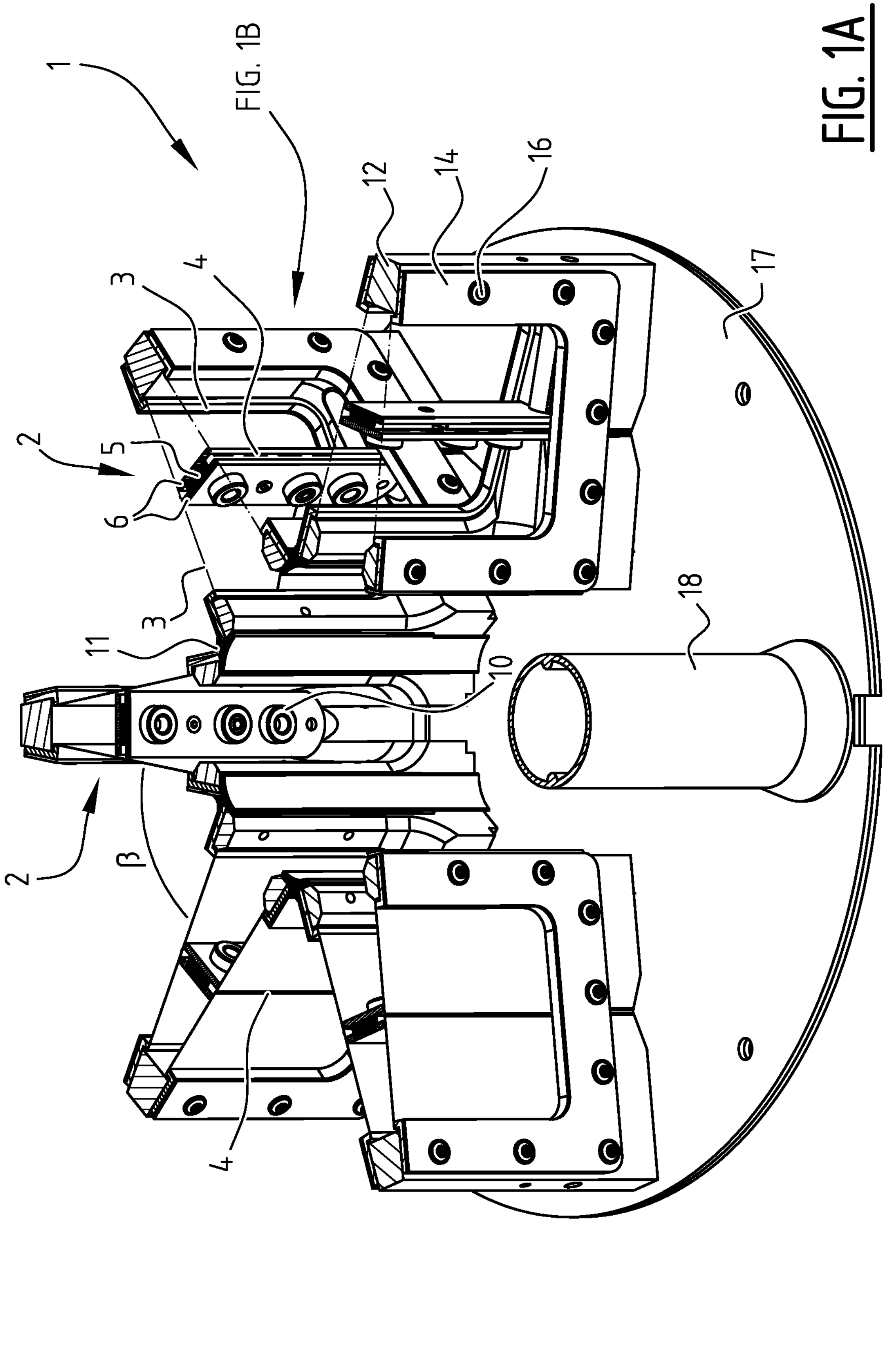
FIG. 1A is a schematic perspective transverse cross section through a speaker according to a first embodiment of the invention.
Figure 1B:
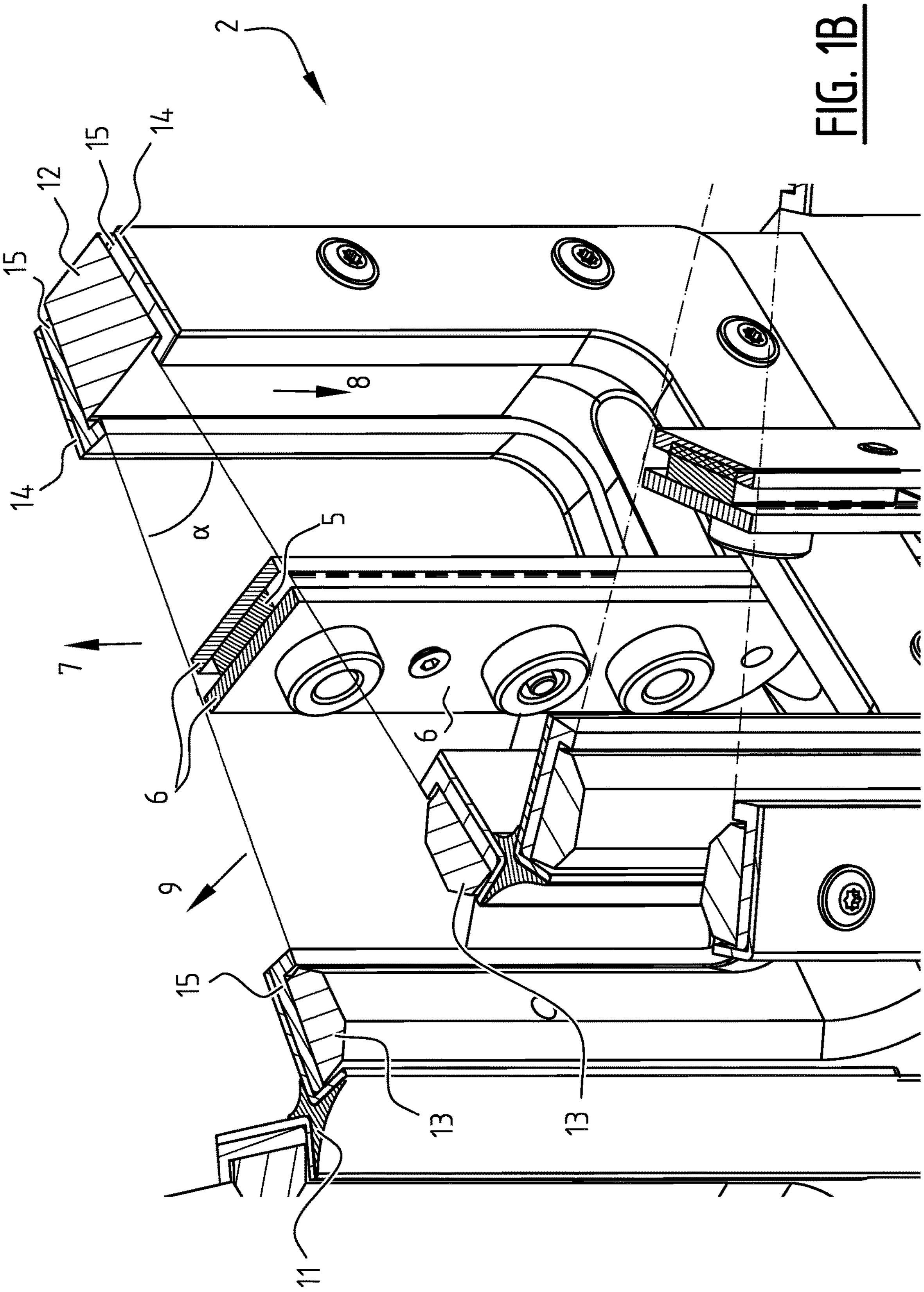
FIG. 1B is a detail of FIG. 1A.

FIG. 1A shows a speaker 1 according to a first embodiment of the invention having five speaker-elements 2 according to a first embodiment of the invention. Two of the speaker-elements 2 are shown transparently. FIG. 1B shows one of the speaker-elements 2 in more detail.

As is clear from FIGS. 1A and 1B each speaker-element 2 comprises two substantially mutually opposing spaced apart membrane planes 3. In this embodiment each membrane plane 3 is formed by a separate membrane 3, for example made of Mylar. Each membrane plane 3 comprises in this embodiment four electromagnetic copper wires 4 arranged for creating a magnetic field upon an electric current passing through said electromagnetic wires 4. The wires 4 extend parallel to each other with no or a small distance there between and are attached to the membrane plane using a kapton tape, such that in the figures the wires 4 appear to be one, rather thick wire. In this embodiment the wires 4 are arranged in the vertical middle line of the membrane plane 3. Between the membrane planes 3 a permanent magnet 5 is arranged, which is held by two holding plates 6, which are arranged on opposite front and back sides of the magnet 5 for holding the magnet 5 there between. Screws 10 are provided for connecting the plates 6 to each other. The magnet 5 extends substantially parallel to the wires 4 and the wires 4 are arranged such that they are in front of the longitudinal side surfaces of the magnet 5. When a current passes through the wires 4 a magnetic field is created thereby. As is shown in FIG. 1B, the current passes through the wires 4 in opposite directions 7, 8 in view of the two membrane planes 3 of the speaker-element 2. As a result of the opposite directions 7, 8 the magnetic fields created by the wires 4 of the two membrane planes 3 are opposite to each other, such that both membrane planes 3 are either attracted towards or repulsed from the magnet 5 and are thus moved in opposite directions. It will be clear for the skilled person that the upward direction 7 and downward direction 8 are shown by way of example only and may be reversed, as long as they are opposite to each other. More in particular, the current passing through wires 4 varies continuously between the upward and downward directions, such that the membrane planes 3 are continuously attracted towards and repulsed from the magnet 5, thereby creating sound waves. External sound waves created on the outside of membrane planes 3 can travel outwards, as indicated by arrow 9. Insulator elements 11 are provided between neighboring speaker-elements 2 for preventing sound waves that are created internally of the speaker-elements 2 to leave the speaker between neighboring speaker-elements 2. The insulator elements may for example be made of rubber or any other suitable material. The applicant has found that otherwise the internal sound waves interfere with the external sound waves. The applicant has found that the internal sound waves may leave the speaker 1 at a back of the speaker 1, but the effect thereof may be negligible. As is further clear from FIGS. 1A and 1B, in this embodiment the membrane planes 3 are diverging under an angle α of 67.5°. As a result of this angle the sound waves travel in a desired direction 9.

As is shown in FIGS. 1A and 1B, the membrane planes 3 are held by a frame. Said frame comprises inner and outer circumferential frame parts 12-14, wherein the inner circumferential frame part 12, 13 comprises a central frame part 12 arranged at the converging, small end of the speaker element 2 to which both membrane planes 3 are attached, and which inner frame part splits into two frame parts 13 in the diverging direction of the speaker-element 2. Two outer circumferential frame parts 14 are attached to the inner circumferential frame part 12, 13, wherein the membrane planes 3 are arranged between the inner and outer circumferential frame parts 12-14 and therefore held tight thereby. Rubber angular profiles 15 extend between the membrane planes 3 and the outer circumferential frame parts 14, such that the membrane planes 3 are tensioned. The outer and inner frame parts 12-14 are attached to each other using screws 16. The inner circumferential frame parts 12, 13 close a circumferential edge zone of the speaker-element 2 at the upper, lower, and outer sides thereof, and only the inner side of the circumferential edge zone of the speaker-element is left open, such that sound waves can travel to the inner part of the speaker and then leave the speaker via elements 11 as described above.

FIG. 1A further shows that the speaker-elements 2 are arranged on a substantially circular plate 17. The speaker-elements 2 extend radially with respect to the central longitudinal line of the speaker 2 and are spaced apart radially by an angular distance β of approximately 60°, such that the five speaker-elements 2 together extend over an angular range of the plate 17 of about 300°. In the area where no speaker-element 2 is provided a cable pipe 18 is provided.

Figure 2:
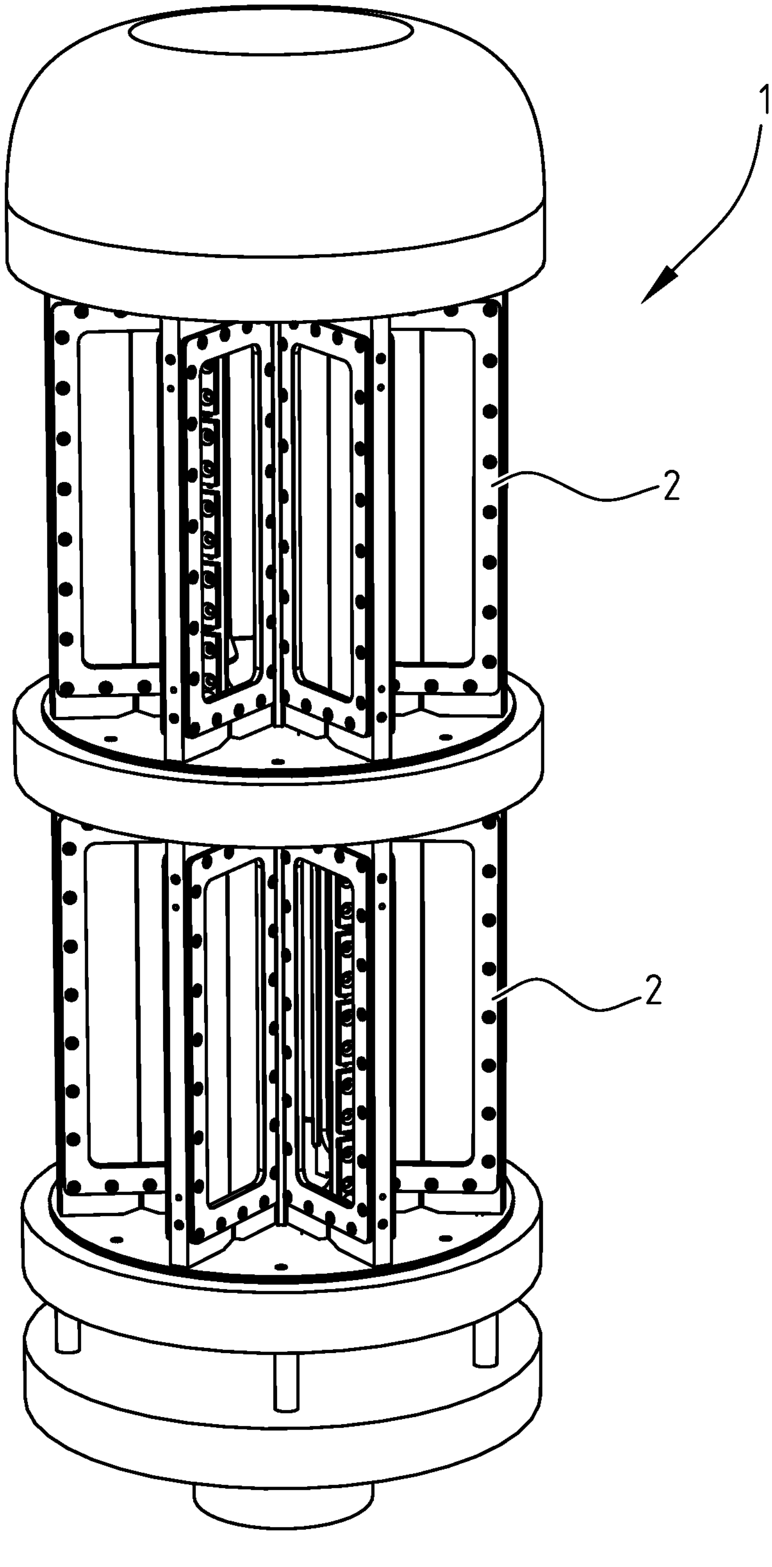
FIG. 2 is a schematic perspective view of a speaker according to a second embodiment of the invention.

FIG. 2 shows a speaker 1 having two rows of speaker-elements 2. The speaker-elements 2 of the two rows are aligned with respect to each other. The speaker-elements 2 may be similar to the speaker-elements 2 of FIGS. 1A and 1B and the reader is referred to the above description of FIGS. 1A and 1B for a description thereof. The speaker 1 is shown in a front perspective view. The cables may be arranged at the back of the speaker 1 where no speaker-element 2 is provided. Other hardware of the speaker may for example be arranged under the two rows of speaker elements 2. The speaker 1 thus provided has a substantially cylindrical shape.

Figure 3A:
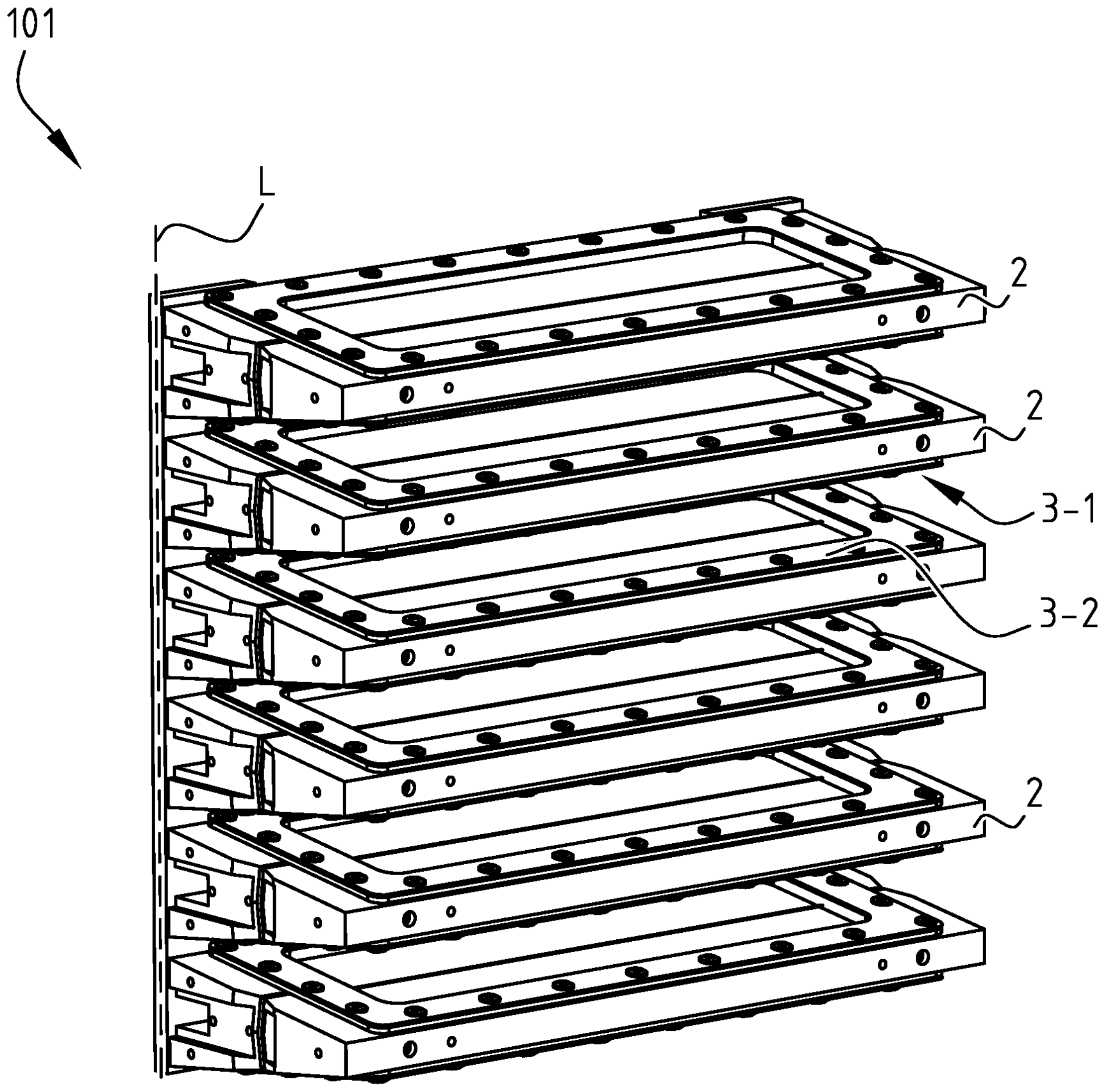
FIGS. 3A and 3B are schematic perspective views of other embodiments of the speaker according to the invention.
Figure 3B:
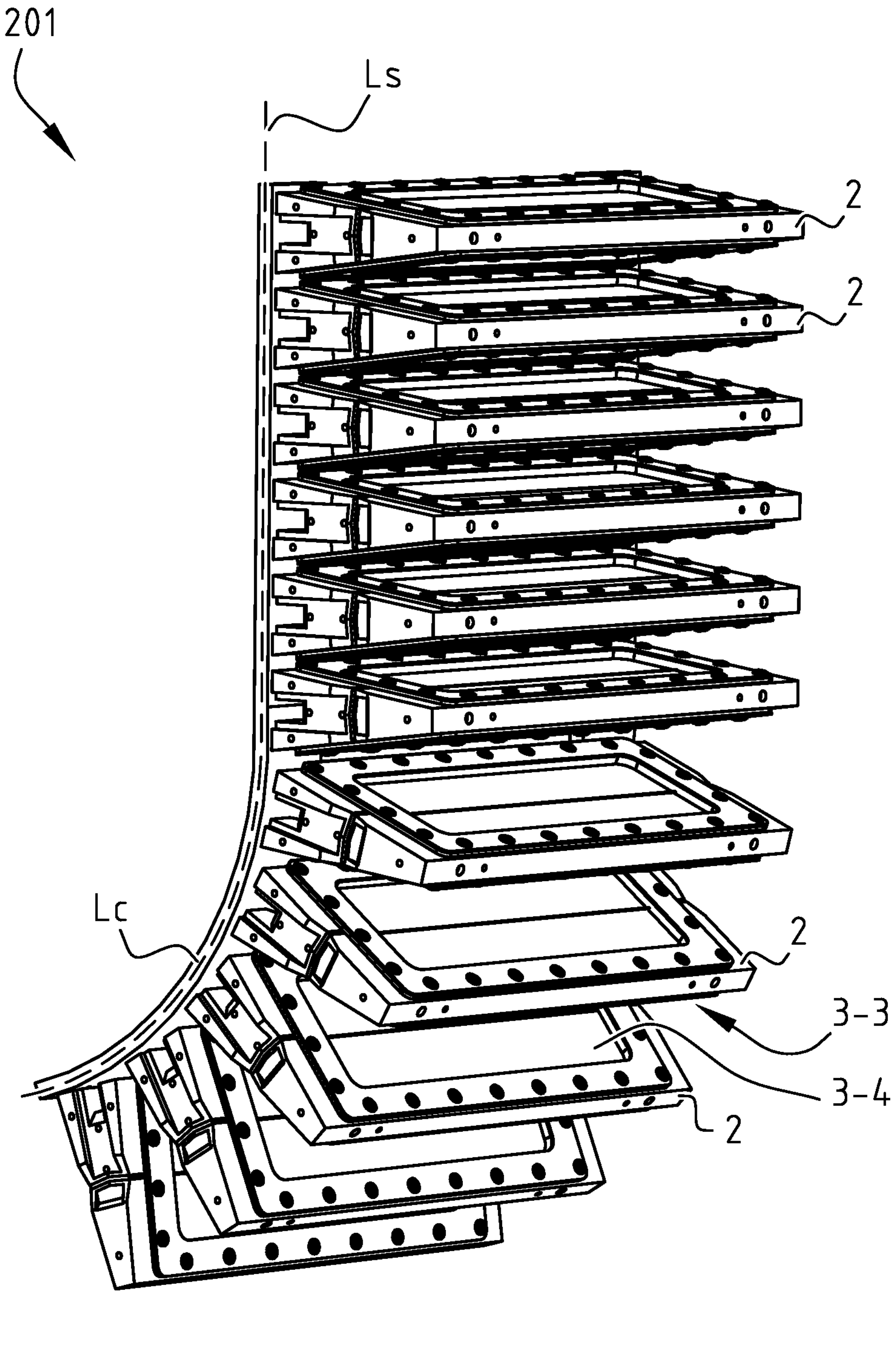

FIG. 3A shows a speaker 102 with a plurality of speaker-elements 2, which are spaced along and aligned with each other along an imaginary line L. For each speaker-element a membrane plane 3 substantially faces a membrane plane 3 of an adjacent speaker-element 2, as shown by membrane planes 3-1 and 3-2. In this example the imaginary line L is straight. FIG. 3B shows another embodiment of the speaker 201, which is similar to the speaker 102 of FIG. 3A, except for the line L which has a straight section $L_s$ and a curved section $L_c$. The curve of the curved section $L_c$ curves away from the non-zero angle between two membrane planes 3-3 and 3-4 of a single speaker-element 2. The speaker elements 2 of speakers 101, 102 of FIGS. 3A and 3B comprise the above-described features, unless stated otherwise.

Although the invention has been described hereabove with reference to a number of specific examples and embodiments, the invention is not limited thereto. Instead, the invention also covers the subject matter defined by the claims, which now follow.

The invention claimed is:

1. A speaker comprising a plurality of speaker-elements, each speaker element comprising:

two substantially mutually opposing spaced apart membrane planes, wherein each membrane plane comprises at least one electromagnetic wire arranged for creating a magnetic field upon an electric current passing through said electromagnetic wire, wherein at least one permanent magnet is arranged between the two membrane planes, wherein the electromagnet wires of the two membrane planes are connectable to an electric power source such that the electric current passes therethrough in substantially mutually opposing directions and thereby creates substantially mutually opposing magnetic fields such that upon passing an electric current through the electromagnetic wire of each membrane plane said membrane planes are both either attracted towards or repulsed from the permanent magnet and thereby moved towards or away from each other, respectively, thereby producing a sound wave, wherein said plurality of speaker-elements are arranged in a radial direction with respect to said central longitudinal line and spaced apart by an angular distance.

2. The speaker according to claim 1, wherein each said electromagnetic wire is arranged substantially in a middle line of each said membrane plane, such that substantially equal membrane parts are arranged on both sides of said electromagnetic wire.

3. The speaker according to claim 1, wherein said permanent magnet extends substantially parallel to the at least two electromagnetic wires with a longitudinal length thereof in such a manner that the at least two electromagnetic wires are arranged in front of two opposing longitudinal surfaces of the permanent magnet.

4. The speaker according to claim 1, wherein said two substantially mutually opposing membrane planes are arranged at an oblique angle with respect to each other, said angle being chosen between 0° and 75°.

5. The speaker according to claim 1, wherein said two membrane planes together define a circumferential edge zone having a first part at a converging end of the speaker element and a second part at a diverging end of the speaker element, which circumferential edge zone is closed over the first part and open over the second part.

6. The speaker according to claim 1, wherein each membrane plane comprises four of said electromagnetic wires, which four wires are arranged in parallel to each other with no or a small mutual distance.

7. The speaker according to claim 1, wherein each said electromagnetic wire is a copper wire.

8. The speaker according to claim 1, wherein each electromagnetic wire is attached to the membrane plane using a polyimide tape.

9. The speaker according to claim 1, comprising a frame for holding a circumferential edge of each membrane plane, wherein the circumferential edge of each membrane plane is arranged between two frame parts of said frame and held tight thereby.

10. The speaker according to claim 9, comprising two angular profiles made of a flexible and/or compressible material, said angular profiles being arranged between said frame parts in the area of said circumferential edge of the membrane plane for tensioning said membrane plane.

11. The speaker according to claim 1, wherein five of said speaker-elements are provided which are spaced apart over an angular distance of about 60°.

12. The speaker according to claim 11, wherein at least one further series of five of said speaker-elements is provided which are spaced apart over an angular distance of about 60°, and wherein the at least one further series is arranged on top of said five speaker-elements in such a manner that the speaker-elements are aligned.

13. A speaker, comprising a plurality of speaker-elements, each speaker-element comprising two substantially mutually opposing spaced apart membrane planes, wherein each membrane plane comprises at least one electromagnetic wire arranged for creating a magnetic field upon an electric current passing through said electromagnetic wire, wherein at least one permanent magnet is arranged between the two membrane planes, wherein the electromagnet wires of the two membrane planes are connectable to an electric power source in such a manner, that the electric current passes there trough in substantially mutually opposing directions and thereby creating substantially mutually opposing magnetic fields, such that upon passing an electric current through the electromagnetic wire of each membrane plane said membrane planes are both either attracted towards or repulsed from the permanent magnet and thereby moved towards or away from each other, respectively, thereby producing a sound wave, wherein the plurality of speaker elements are spaced along and aligned with each other along an imaginary line with one membrane plane of one speaker-element substantially facing a membrane plane of an adjacent speaker-element, thereby forming a column of speaker elements.

14. The speaker according to claim 13, wherein the imaginary line along which the speaker-elements are arranged comprises a first section which is straight, and a second section which is curved.

15. The speaker according to claim 13, wherein said two substantially mutually opposing membrane planes are arranged at an oblique angle with respect to each other, said angle being between 0° and 75°.

16. The speaker according to claim 13, wherein each electromagnetic wire is arranged substantially in a middle line of each membrane plane, such that substantially equal membrane parts are arranged on both sides of said electromagnetic wire.

17. The speaker according to claim 13, wherein said two membrane planes together define a circumferential edge zone, which circumferential edge zone is closed over a first part and open over a second part.

18. The speaker according to claim 13, comprising a frame for holding a circumferential edge of each membrane plane, wherein the circumferential edge of each membrane plane is arranged between two frame parts of said frame and held tight thereby.

19. A speaker-element for a speaker, comprising two substantially mutually opposing spaced apart membrane planes, wherein each membrane plane comprises at least one electromagnetic wire arranged for creating a magnetic field upon an electric current passing through said electromagnetic wire, wherein at least one permanent magnet is arranged between the two membrane planes, wherein the electromagnet wires of the two membrane planes are connectable to an electric power source in such a manner, that the electric current passes there trough in substantially mutually opposing directions and thereby creating substantially mutually opposing magnetic fields, such that upon passing an electric current through the electromagnetic wire of each membrane plane said membrane planes are both either attracted towards or repulsed from the permanent magnet and thereby moved towards or away from each other, respectively, thereby producing a sound wave, wherein the speaker element further comprises a frame for holding a circumferential edge of each membrane plane, wherein the circumferential edge of each membrane plane is arranged between two frame parts of said frame and held tight thereby.

20. The speaker-element according to claim 19, comprising two angular profiles made of a flexible and/or compressible material, such as rubber, said angular profiles being arranged between said frame parts in the area of said circumferential edge of the membrane plane, for tensioning said membrane plane.

* * * * *